United States Patent

[11] 3,611,985

| [72] | Inventor | Thomas W. Juday<br>New Berlin, Wis. |
|---|---|---|
| [21] | Appl. No. | 859,959 |
| [22] | Filed | Sept. 22, 1969 |
| [45] | Patented | Oct. 12, 1971 |
| [73] | Assignee | Imprex, Inc.<br>Greenfield, Wis. |

[54] IMPREGNATING APPARATUS
5 Claims, 1 Drawing Fig.

[52] U.S. Cl. .................................................. 118/50,
118/408
[51] Int. Cl. ....................................................... B05c 7/00
[50] Field of Search ........................................... 118/50, 408

[56] References Cited
UNITED STATES PATENTS

| 1,508,179 | 9/1924 | Goff | 118/50 |
|---|---|---|---|
| 2,087,974 | 7/1937 | Hothersall | 118/408 X |
| 2,287,024 | 6/1942 | Casellini | 118/408 X |
| 2,392,229 | 1/1946 | Cohen | 118/408 X |
| 2,551,380 | 5/1951 | Larsen et al. | 118/408 |
| 3,224,411 | 12/1965 | Blaha et al. | 118/408 |

*Primary Examiner*—John P. McIntosh
*Attorneys*—Allan W. Leiser and Arthur H. Seidel ABSTRACT: An apparatus for impregnating a liquid sealant into the bore surface of a wheel hub or the like includes a sealant reservoir with an outlet line leading to the bore and a closed manifold leading from the bore. The manifold and outlet line communicate with the bore through openings in a work surface and a hydraulically actuated platen which together clamp the hub in place and seal off the ends of the bore. During impregnating, the reservoir is pressurized to force sealant through the outlet line into the bore and manifold, and air is trapped in the manifold and compressed until a desired system pressure is reached. After a suitable time, the pressure in the reservoir is released, and the trapped air expands to cause the sealant to move quickly back to the reservoir.

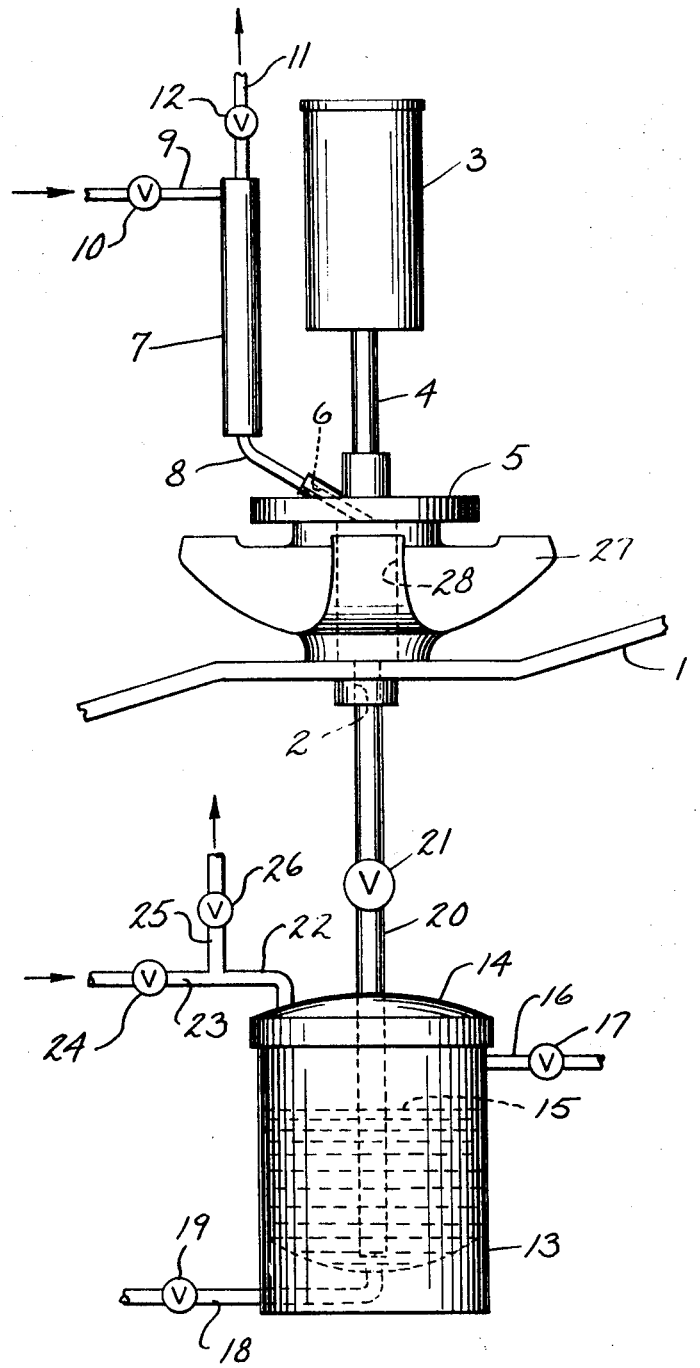

IMPREGNATING APPARATUS

BACKGROUND OF THE INVENTION

This invention relates to apparatus for impregnating a liquid sealant into the bore surface of a truck wheel hub or the like. Many trucks are provided with self-oiling systems in which engine oil under pressure is fed through an auxiliary conduit system into the bores of the wheel hubs. The hubs are generally cast, however, and are thus relatively porous so that the oil under pressure can ultimately work its way entirely through the casting and be lost; and it is desirable to impregnate a sealant into the bore surface of the hub to prevent this. Various processes and different types of apparatus have been used to effect such impregnation, but none has heretofore proven entirely satisfactory. Particular problems have been that prior processes and apparatus have required the use of relatively high temperatures and a great deal of time for satisfactory impregnation. Further, it has been difficult to efficiently remove the remaining sealant from the bore after impregnation has been completed.

SUMMARY OF THE INVENTION

This invention contemplates a pressurized impregnating apparatus making use of a sealed manifold in which air is trapped to develop a back pressure, which trapped air also serves to force the sealant back into a reservoir after impregnation has been completed; and the preferred embodiment of the invention shown herein also includes a desirable air testing system. With the apparatus of the invention, impregnating times and temperatures can be dramatically reduced, but the quality of the impregnation is improved. The apparatus is strong and durable, while still being relatively simple and inexpensive to manufacture and use. This listing of objects and advantages is not intended to be exclusive, however, and others will appear from the description to follow.

BRIEF DESCRIPTION OF THE DRAWING

FIG. 1 is a fragmentary schematic view of an impregnating apparatus constituting a preferred embodiment of the invention.

DESCRIPTION OF THE PREFERRED EMBODIMENT

In the drawing, the reference numeral 1 refers to a worktable, which is of course suitably supported in known manner, which is provided with an opening 2 leading upwardly therethrough. A hydraulic cylinder 3 is suitable supported above the table 1, and at the end of its extensible and retractable rod 4 is a platen 5. The platen 5 is provided with an opening 6 leading upwardly therethrough at an angle.

A closed, tubular manifold member 7 is suitably supported near the cylinder 3, and is connected to the opening 6 by means of a fluid line 8. The platen 5 will of course move upwardly and downwardly in response to actuation of the cylinder 3, and to accommodate this movement the manifold 7 can be vertically slidably mounted or the line 8 can be flexible. A test air inlet line 9 leads to the upper or closed end of the manifold 7 and is opened and closed by means of a test inlet valve 10. A test air blowoff line 11 also leads from the closed end of the manifold 7 and is controlled by a test blowoff valve 12.

A sealant reservoir 13 is suitably supported below the table 1 and is provided with a removable cover 14. A quantity of sealant 15 is within the reservoir 13, and may be of any suitable type well known to those skilled in the art. A sealant supply line 16 leads into the upper portion of the reservoir 13 and is controlled by a supply valve 17. A drain line 18 leads from the bottom of the reservoir 13 and is controlled by a drain valve 19.

A sealant outlet line 20 leads from the reservoir 13 upwardly through the cover 14 and is connected to the opening 2, and the line 20 may be opened and closed by means of a shutoff valve 21 interposed therein. An operating air line 22 leads through the cover 14 into the top of the reservoir 13 and is branched outwardly thereof to define an operating inlet line 23 controlled by an operating inlet valve 24 and an operating blowoff line 25 controlled by an operating blowoff valve 26.

The reference numeral 27 denotes a conventional truck wheel hub which has an axial bore 28, the inner cylindrical surface of which is to be impregnated by means of the apparatus of the invention.

To effect impregnation, the hub 27 is first moved into position on the table 1 with the bore 28 over and in communication with the opening 2. The cylinder 3 is actuated to raise the platen 5 to allow the hub 27 to be thus moved into place, and thereafter the rod 4 is extended to bring the platen down tightly against the top of the hub 27 with the opening 6 in communication with the bore 28, this latter position being that actually seen in the drawing. The hub 27 is thus clamped between the platen 5 and work surface 1, and the ends of the bore 28 are sealed off except insofar as the openings 2 and 6 are in communication therewith. The outlet line 20, bore 28 and manifold 7 together form a continuous, air-filled, passage; and the outer end of the passage, or in other words the outer or upper end of the manifold 7, is closed, assuming that the test valves 10 and 12 are closed as they are during normal operation.

The sealant supply valve 17 and drain valve 19 are intended to remain closed throughout operation of the apparatus, and are opened only when it is desired to add or drain away sealant 15. They will not, therefore, be referred to in connection with the operation of the apparatus. Similarly, during ordinary impregnating operation the shutoff valve 21 remains open and, as indicated above, the test valves 10 and 12 remain closed so that the manifold 7 is effectively closed at its far end. The valves 10, 12 and 21 establish an air testing system which will be discussed hereafter and do not play any part in the normal impregnating operation, although the valve 21 also serves as an emergency shutoff as will be described.

At the beginning of an impregnating operation, the operating blowoff valve 26 is closed and the operating inlet valve 24 is opened to admit air under pressure from a suitable source (not shown) into the top of the reservoir 13. This pressurizes the reservoir 13 and forces sealant 15 upwardly through the line 20 and opening 2 into the bore 28 and further upwardly through the opening 6 and line 8 into the manifold 7. During this process, the air in the passage will be trapped at the upper end of the manifold 7 and pressurized. Pressure of the trapped air builds up until it equals the inlet pressure in the line 23, and this establishes the desired system pressure. Sealant in the bore 28 is forced into the surface thereof at the system pressure, and the pressure is maintained for a suitable time until the desired degree of impregnation has been attained. It is important to note, however, that with the apparatus of this invention impregnation can be accomplished in approximately 20 seconds with the sealant at room temperature, which is in sharp contrast to older systems in which impregnation might require more than 10 minutes and a sealant temperature of 180° F. or more. Should there be a major leak, the valve 21 can be used as an emergency shutoff to cut off the supply of sealant.

After impregnation has been completed the operating inlet valve 24 is closed and the operating blowoff valve 26, which is effective between the valve 24 and the reservoir 13, is opened to atmosphere. When this occurs, the air trapped in the manifold 7 under pressure expands and forces the sealant quickly out of the manifold 7 through the line 8 and openings 6, through the bore 28 and opening 2 and through the line 20 back into the reservoir 13 to quickly and efficiently clean the passageway. The platen 5 can then be raised and the hub 27 moved to a washing or other processing area (not shown).

If it is desired to test the hub 27 either before or after impregnation, the shutoff valve 21 is closed and the test valves 10 and 12 actuated as will be described. This procedure is accomplished with the platen 5 down as shown in the drawing and without any sealant 15 in the passageway. With the valve 21 closed, the test blowoff valve 12 is first closed and the test inlet valve 10 is then opened to admit air under pressure from the same or another source (not shown). This air passes through the manifold 7, line 8 and opening 6 and into the bore 28 where it is under pressure and will escape through any leaks in the hub 27. The presence of leaks can be determined, for example, by means of applying a soap solution or in other accepted ways. After testing has been completed, the valve 10 is closed and the valve 12 is opened to release the air used for testing. The valve 12 can then be closed and the valve 21 opened to ready the system for another impregnating step.

The apparatus shown and described provides for a highly efficient impregnation, and also allows for testing, all in a relatively simple apparatus that is easy to operate and control. The apparatus has been shown only schematically and it will be obvious that other elements, such as suitable supporting structure, control circuitry, sources of compressed air, sealant sources, drain fittings, etc. will be supplied. These are all known to those skilled in the art, however, and such persons will be able to practice the invention from the showing and description herein. It should also be obvious that various modifications in structure and use might be made without departure from the spirit of the invention. By way of only one example, it is not necessary to use the completely separate operating valves 24, 26 and test valves 10, 12, and single, three-position valves (which would in effect still constitute two valve means) might be substituted in one or both cases. Further, the test valves 10, 12 need not necessarily be at the end of the manifold 7 and need only be effectively between the closed end and the valve 21. Similarly, although the apparatus is intended primarily for use in impregnating truck wheel hubs, it can obviously be adapted for impregnating other items with other types of compounds. In view of the various possible modifications, it is not intended that the invention be limited by the showing herein or in any other manner except as may specifically be required.

I claim:

1. In an apparatus for impregnating a sealant into the bore surface of a wheel hub or the like, the combination comprising: means to close off the ends of the bore; a liquid reservoir with an outlet line leading to and communicating with the bore; a closed end manifold communicating with and leading from the bore, the outlet line, bore and manifold together forming a continuous, closed end passage with air trapped therein; and means to pressurize the reservoir to force sealant through the outlet line and into the bore, with the air in the passage being compressed at the closed end of the manifold as a result thereof, the pressurizing means being releasable to allow the compressed air to expand and force the sealant from the bore back toward the reservoir.

2. Apparatus according to claim 1 wherein the means to close off the ends of the bore comprises a work surface and a platen movable toward and away from the work surface to clamp the hub therebetween; and the work surface and platen each have an opening therethrough communicating with the bore; and the outlet line leads to one of said openings and the manifold leads from the other of said openings.

3. Apparatus according to claim 2 wherein the means to pressurize the reservoir includes an operating air line leading to the reservoir and adapted to be connected to a source of air under pressure; an operating inlet valve means in the operating air line that is adapted to open and close the same; and an operating blowoff valve means in the operating air line between the operating inlet valve means and the reservoir which is operable to vent the operating air line to atmosphere; and wherein there is a shutoff valve in the outlet line; and there is test valve means effectively interposed between the shutoff valve and the closed end of the manifold to allow the introduction of air under pressure into the passageway and the release of such air.

4. Apparatus according to claim 1 wherein the means to pressurize the reservoir includes an operating air line leading to the reservoir and adapted to be connected to a source of air under pressure; an operating inlet valve means in the operating air line that is adapted to open and close the same; and an operating blowoff valve means in the operating air line that is effectively between the operating inlet valve means and the reservoir and that is operable to vent the operating air line to atmosphere.

5. Apparatus according to claim 1 wherein there is a shutoff valve in the outlet line; and there is test valve means effectively interposed between the shutoff valve and the closed end of the manifold to allow the introduction of air under pressure into the passageway.